(12) United States Patent
Maeda

(10) Patent No.: US 6,437,873 B1
(45) Date of Patent: Aug. 20, 2002

(54) INTERNET FACSIMILE APPARATUS, NETWORK SYSTEM HAVING THE SAME, AND METHOD OF CONTROLLING THE SAME

(75) Inventor: Toru Maeda, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/263,860

(22) Filed: Mar. 8, 1999

(30) Foreign Application Priority Data

Mar. 9, 1998 (JP) .......................................... 10-057253

(51) Int. Cl.[7] .............................. H04N 1/00; H04N 1/32; G06F 15/00
(52) U.S. Cl. ...................... 358/1.15; 358/402; 358/442
(58) Field of Search ................................ 358/1.15, 442, 358/405, 434, 435, 436, 402; 379/100.08, 100.15, 100.17, 100.06; 709/207

(56) References Cited

U.S. PATENT DOCUMENTS

| | | | | |
|---|---|---|---|---|
| 5,689,642 A | * | 11/1997 | Harkins et al. | 709/207 |
| 5,739,919 A | * | 4/1998 | Lee et al. | 385/442 |
| 5,881,233 A | * | 3/1999 | Toyoda et al. | 358/402 |
| 6,266,160 B1 | * | 7/2001 | Saito et al. | 358/1.15 |
| 6,335,966 B1 | * | 1/2002 | Toyoda | 358/442 |

FOREIGN PATENT DOCUMENTS

EP 812100 12/1997
EP 818916 1/1998

OTHER PUBLICATIONS

Newman, P. et al., "An Extensible Message Format For Message Disposition Notifications", RFC Specification RFC2298.TXT, Online, Mar. 1, 1998.

Toyoda, H. et al., "A Simple Mode Of facsimile Using Internet Mail", RFC Specification RFC2305.TXT, Online, Mar. 1, 1998.

* cited by examiner

Primary Examiner—Kimberly A. Williams
(74) Attorney, Agent, or Firm—Fitzpatrick, Cella, Harper & Scinto

(57) ABSTRACT

Disclosed are an Internet FAX apparatus having an Internet FAX function capable of transmission with an optimum Internet FAX receiving capability requiring no communication charge, a network system including the apparatus, and a method of controlling the apparatus. The Internet FAX apparatus of this invention inquires a receiving apparatus of its receiving capability by the SMTP protocol before transmitting an image file, and receives information of the receiving capability from the receiving apparatus by the SMTP protocol. The Internet FAX apparatus converts a read image into an image file corresponding to the receiving capability of the receiving apparatus and transmits the image file by the SMTP protocol. The Internet FAX apparatus requests the receiving apparatus to transmit a reception confirmation message when transmitting the image file, and receives the reception confirmation message.

21 Claims, 9 Drawing Sheets

FIG. 2

| | |
|---|---|
| Date: Wed,20 Sep 1995 00:19:00 (EDT)-0400 | LINE 1 |
| From: Jane Sender <Jane_Sender@huge.com> | LINE 2 |
| Message-Id: <199509200019.12345@huge.com> | LINE 3 |
| Subject: Internet FAX Full Mode Capability Request | LINE 4 |
| To: Tom Recipient <Tom_Recipient@mega.edu> | LINE 5 |
| Disposition-Notification-To: Jane_Senser@huge.com | LINE 6 |
| Disposition-Notification-Options: X-G3FAX-capability-request=required | LINE 7 |

FIG. 3

| | |
|---|---|
| Date: Wed,20 Sep 1995 00:19:00 (EDT)-0400 | LINE 1 |
| From: Tom Recipient <Tom_Recipient@mega.edu> | LINE 2 |
| Message-Id: <199509200020.12345@mega.edu> | LINE 3 |
| Subject: Internet FAX Full Mode Capability Response | LINE 4 |
| To: Jane Sender <Jane_Sender@huge.com> | LINE 5 |
| MINE-Version: 1.0 | LINE 6 |
| Content-Type: multipart/report; report-type=disposition-notification; | LINE 7 |
|     boundary="RAA14128.773615766/mega.edu" | LINE 8 |
| | LINE 9 |
| --RAA14128.773615766/mega.edu | LINE 10 |
| | LINE 11 |
| The message sent on 1995 Sep 19 at 00:18:00 (EDT)-0400 to | LINE 12 |
| Tom Recipient <Tom_Recipient@mega.edu> with subject "Internet Fax Full | LINE 13 |
| Mode Capability Request " has been processed in Internet FAX Full Mode. | LINE 14 |
| | LINE 15 |
| --RAA14128.773615766/mega.edu | LINE 16 |
| Content-Type: message/disposition-notification | LINE 17 |
| | LINE 18 |
| Reporting-UA: Toms-pc.cs.mega.edu; IFAX-FullMode | LINE 19 |
| Original-Recipient: rfc822;Tom-Recipient@mega.edu | LINE 20 |
| Final-Recipient: rfc822;Tom-Recipient@mega.edu | LINE 21 |
| Original-Message-ID: <199509200021.12345@fuge.com> | LINE 22 |
| Disposition:automatic-action/MDN-sent-automatically; | LINE 23 |
|     processed / X-G3Fax-capability-request | LINE 24 |
| X-G3Fax-t30frame: X-G3Fax-frame=40,3333333320323220313131; | LINE 25 |
|     X-G3Fax-frame=20,0000888; | LINE 26 |
|     X-G3Fax-frame=80,00CF79 | LINE 27 |
| | LINE 28 |
| --RAA14128.773615766/mega.edu | LINE 29 |

FIG. 4

| | |
|---|---|
| Date: Wed,20 Sep 1995 00:21:00 (EDT)-0400 | LINE 1 |
| From: Jane Sender <Jane_Sender@huge.com> | LINE 2 |
| Message-Id: <199509200021.12345@huge.com> | LINE 3 |
| Subject: Internet FAX Full Mode Image Transmission | LINE 4 |
| To: Tom Recipient <Tom_Recipient@mega.edu> | LINE 5 |
| MINE-Version: 1.0 | LINE 6 |
| Disposition-Notification-To: Jane_Senser@huge.com | LINE 7 |
| Disposition-Notification-Options: X-G3Fax-report-required; | LINE 8 |
|         X-G3Fax-frame=43,3737373720383820393939; | LINE 9 |
|         X-G3Fax-frame=23,00088; | LINE 10 |
|         X-G3Fax-frame=83,00C679 | LINE 11 |
| Content-Type: multipart/mixed; | LINE 12 |
|     boundary="RAA14128.773615768/huge.com" | LINE 13 |
| | LINE 14 |
| --RAA14128.773615768/huge.com | LINE 15 |
|     Content-Type: text/plain; charset=us-ascii | LINE 16 |
|     [original text message goes here] | LINE 17 |
| | LINE 18 |
| --RAA14128.773615766/huge.com | LINE 19 |
|     Content-Type: image/ tiff;application=faxbw | LINE 20 |
|     Content-Transfer-Encoding:base64 | LINE 21 |
|     [original TIFF -FX message goes here] | LINE 22 |
| | LINE 23 |
| --RAA14128.773615768/huge.com-- | LINE 24 |

FIG. 5

| | |
|---|---|
| Date: Wed,20 Sep 1995 00:22:00 (EDT)-0400 | LINE 1 |
| From: Tom Recipient <Tom_Recipientr@mega.edu> | LINE 2 |
| Message-Id: <199509200022.12345@mega.edu> | LINE 3 |
| Subject: Internet FAX Full Mode Disposition notification | LINE 4 |
| To: Jane Senser <Jane_Senser@huge.com> | LINE 5 |
| MINE-Version:1.0 | LINE 6 |
| Content-Type:multipart/report; report-type=disposition-notification; | LINE 7 |
|     boundary="RAA14128.773615769/mega.edu" | LINE 8 |
| | LINE 9 |
| --RAA14128.773615769/mega.edu | LINE 10 |
| | LINE 11 |
| The message sent on 1995 Sep 19 at 00:21:00 (EDT)-0400 to | LINE 12 |
| Tom Recipient <Tom_Recipient@mega.edu> with subject "Internet Fax Full | LINE 13 |
| Mode Image Transmission" has been processed in Internet FAX Full Mode. | LINE 14 |
| This is no guarantee that the message has been read or understood. | LINE 15 |
| | LINE 16 |
| --RAA14128.773615769/mega.edu | LINE 17 |
| Content-Type: message/disposition-notification | LINE 18 |
| | LINE 19 |
| Reporting-UA: Toms-pc.cs.mega.edu; IFAX-FullMode | LINE 20 |
| Original-Recipient: rfc822;Tom-Recipient@mega.edu | LINE 21 |
| Final-Recipient: rfc822; Tom-Recipient@mega.edu | LINE 22 |
| Original-Message-ID: <199509200021.12345@fuge.com> | LINE 23 |
| Disposition: automatic-action/MDN-sent-automatically; processed / | LINE 24 |
|     X-G3Fax-report-request | LINE 25 |
| X-G3Fax-Report: X-G3Fax-Results=00; | LINE 26 |
|     X-G3Fax-Page=5 | LINE 27 |
| | LINE 28 |
| | LINE 29 |
| --RAA14128.773615769/mega.edu-- | LINE 30 |
| Content-type: image/tiff; application=faxbw | LINE 31 |
| Content-Transfer-Encoding: base64 | LINE 32 |
| | LINE 33 |
|     [TIFF-FX message goes here] | LINE 34 |
| | LINE 35 |
| --RAA14128.773615769/huge.com-- | LINE 36 |

FIG. 6

| ONE-TOUCH NUMBER | INTERNET FAX FUNCTION | INTERNET ADDRESS | ABBREVIATION OF OTHER PARTY | RECEIVING APPARATUS CSI | RECEIVING APPARATUS NSF | RECEIVING APPARATUS DIS | DATE AND TIME OF ACQUISITION |
|---|---|---|---|---|---|---|---|
| 01 | UNKNOWN | ifax01.canxx.com | | | | | |
| 02 | Simple | ifax@canxx.co.jp | | | | | |
| 03 | Full | ifax@canxx.com | CANO G3/IFAX | 1234 567 | 000088 | 00cf79 | 980303 |
| 04 | | | | | | | |
| 05 | | | | | | | |
| 06 | | | | | | | |
| 07 | | | | | | | |

INTERNET FACSIMILE APPARATUS, NETWORK SYSTEM HAVING THE SAME, AND METHOD OF CONTROLLING THE SAME

BACKGROUND OF THE INVENTION

1. Field of the Invention

The present invention relates to an Internet facsimile (to be referred to as Internet FAX hereinafter) apparatus for transmitting and receiving images by Internet FAX via the Internet, a network system having the apparatus, and a method of controlling the apparatus.

2. Description of the Related Art

Conventionally, images can be transmitted and received by connecting to the Internet via a LAN and using the Internet FAX mode requiring no communication charge.

The Internet FAX has the Simple Mode in which TIFF files are transmitted and received by e-mail.

Unfortunately, the above conventional system cannot transmit with optimum Internet FAX capability for the reasons explained below.

(1) The system cannot detect the type of Internet FAX capability of a communication partner during Internet FAX communication.

(2) Images transmittable in the Simple Mode are restricted to A4, 200 dpi, and MH.

(3) The system cannot detect whether a receiving apparatus has received and printed out an image.

SUMMARY OF THE INVENTION

The present invention has been made to solve the above conventional problems, and has as its object to provide an Internet FAX apparatus having an Internet FAX function capable of transmitting with optimum Internet FAX receiving capability requiring no communication charge by (1) requesting a capability of the apparatus (2) notifying a communication partner of the Internet FAX receiving capability of the apparatus in the Internet FAX mode, (3) transmitting an image file corresponding to the Internet receiving capability of a receiving apparatus, and (4) notifying a transmitting apparatus of the result of reception, a network system having the Internet FAX apparatus, and a method of controlling the apparatus.

To achieve the above object, frame information of a T30 DIS signal is carried on the mdn (message disposition notification) message format of the SMTP protocol, and a header storing the Internet FAX receiving capability of the Internet FAX apparatus of the present invention is formed. This Internet FAX apparatus comprises (1) means for transmitting an mdn request which inquires a receiving apparatus of its Internet FAX receiving capability before transmission of an Internet FAX image message, (2) means for notifying a transmitting apparatus of the Internet FAX capability of the Internet FAX apparatus by storing it in the header of the mdn, in response to the mdn request inquiring the Internet FAX capability from the transmitting apparatus, (3) means for receiving this mdn response, (4) means for transmitting an image file in accordance with the Internet FAX receiving capability of the receiving apparatus, (5) means for transmitting a message requesting the receiving apparatus to transmit reception confirmation, and (6) means for transmitting the reception confirmation message in response to the reception confirmation request from the transmitting apparatus.

The mdn is a standard system scheduled to be formed into RFC by IETF (Internet Engineering Task Force). The mdn defines a format by which the transmitting side requests the receiving side to transmit the processing result of e-mail and the receiving side responds to the request. Details are described in Internet-Draft "An Extensible Message Format for Message Disposition Notifications" draft-ietf-receipient-mdn-07.txt.

In the present invention with the above arrangement, (1) a transmitting apparatus can transmit an image file with optimum Internet FAX receiving capability and (2) a receiving apparatus can notify the transmitting apparatus of the completion of reception.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing an Internet FAX capability notification request in the embodiment;

FIG. 3 is a view showing an Internet FAX capability notification in the embodiment;

FIG. 4 is a view showing Internet FAX image message transmission and reception notification requests in the embodiment;

FIG. 5 is a view showing an Internet FAX reception notification in the embodiment;

FIG. 6 is a view showing the format of destination data in the embodiment;

DETAILED DESCRIPTION OF THE PREFERRED EMBODIMENT

An embodiment of the present invention will be described below with reference to the accompanying drawings.

Figure 1:
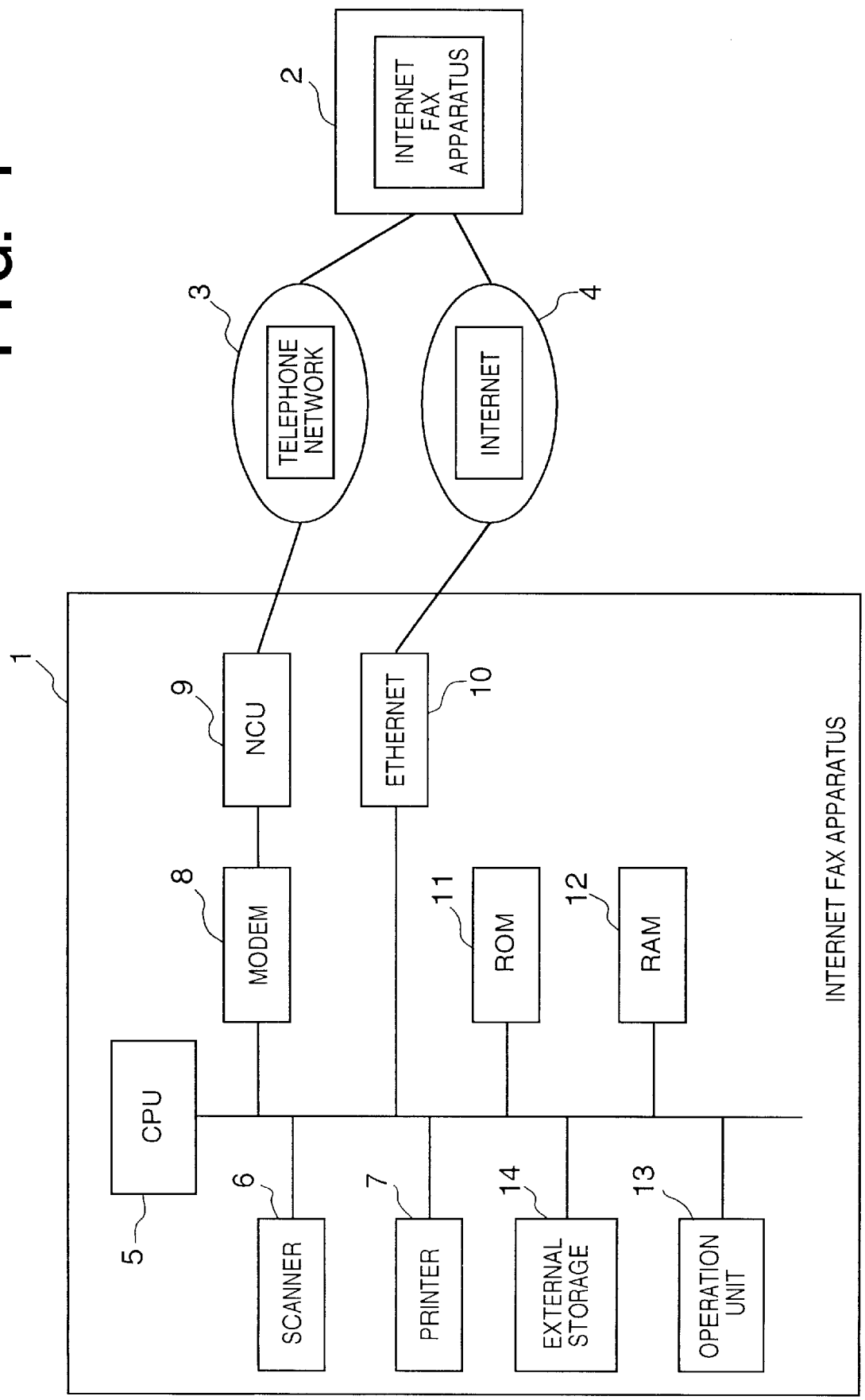
FIG. 1 is a block diagram showing one embodiment of image communication by the Internet FAX apparatus of the present invention.

FIG. 1 is a block diagram showing one embodiment of image communication by the Internet FAX apparatus of the present invention.

In FIG. 1, reference numeral 1 denotes an apparatus on the transmitting side for transmitting an image;

2, an apparatus on the receiving side for receiving an image, which has the same arrangement as the transmitting apparatus;

3, a telephone network for communicating G3 FAX;

4, the Internet for carrying e-mail;

5, a CPU for controlling the apparatus;

6, a scanner for reading an original;

7, a printer for printing out an image;

8, a FAX modem for communicating in the G3 FAX mode;

9, an NCU for connected to the telephone line;

10, an Ethernet interface for connected to the Internet;

11, a ROM storing control software;

12, a RAM for storing work of the control software and destination data;

13, an operation unit including one-touch buttons for inputting transmission destinations; and 14, an external storage such as a floppy disk or CD-ROM.

Referring to FIG. 1, the Internet FAX apparatus 1 functions as the transmitting side, and the Internet FAX apparatus 2 functions as the receiving side. The internal structure of the Internet FAX apparatus 2 is the same as the transmitting side, so this structure is not shown in FIG. 1. The telephone network 3 is used for G3 facsimile communication. The Internet 4 is a network for Internet e-mail communication. The CPU 5 controls the Internet FAX apparatus 1. The scanner 6 reads an original and converts it into image data. The printer 7 prints out image data as an image on a printing sheet. The modem 8 modulates and demodulates a G3 FAX protocol signal and image signal. The NCU 9 is connected to the telephone network 3 to make an outgoing call to and receive an incoming call from the line and to interface analog signals. The Ethernet interface 10 is connected to the Internet 4 to exchange digital signals as ICP/IP packets. The ROM 11 stores control programs and control data of the Internet FAX apparatus 1. The CPU 5 executes these control programs and data. The RAM 12 is used as a work area for the control programs of the Internet FAX apparatus 1 and stores control data and destination data. The CPU 5 accesses these data in the RAM 12. The operation unit 13 includes one-touch buttons with which an operator designates a destination in transmission. The control programs and control data can also be stored in the external storage 14. If this is the case, these control programs and data are loaded into the RAM 12 and executed by the CPU 5.

In the above arrangement, an image file is transmitted and received in the Internet FAX Simple Mode following the procedure explained below. The Simple Mode is a system by which a TIFF image signal of A4, 200 dpi, and MH is transmitted as an attached file of e-mail. In this embodiment, a method of transmitting e-mail will be described below.

(1) An operator sets an original on the scanner 6 of the transmitting apparatus 1 and presses a one-touch button on the operation unit 13.

(2) In accordance with the destination designated by the operation unit 13, destination data is read out from the RAM 12. If the Internet FAX mode is designated, an Internet address is read out from the RAM 12.

(3) The scanner 6 of the transmitting apparatus 1 reads the original, and the CPU 5 converts the read original into image data in accordance with the control software in the ROM 11.

(4) The CPU 5 converts the image data into an attached file of e-mail in accordance with the control software in the ROM 11.

(5) The Internet address is set as the destination of the e-mail. By using the SMTP protocol for transmitting e-mail, the e-mail containing the image data is transmitted from the Ethernet interface to the receiving apparatus via the Internet.

(6) The receiving apparatus 2 receives the e-mail in accordance with the standard SMTP protocol.

(7) When the attached file of the e-mail is detected, whether the attached file is image data is checked. After that, the attached file is converted into image data, and the image data is transferred to the printer and printed out.

Figure 7:
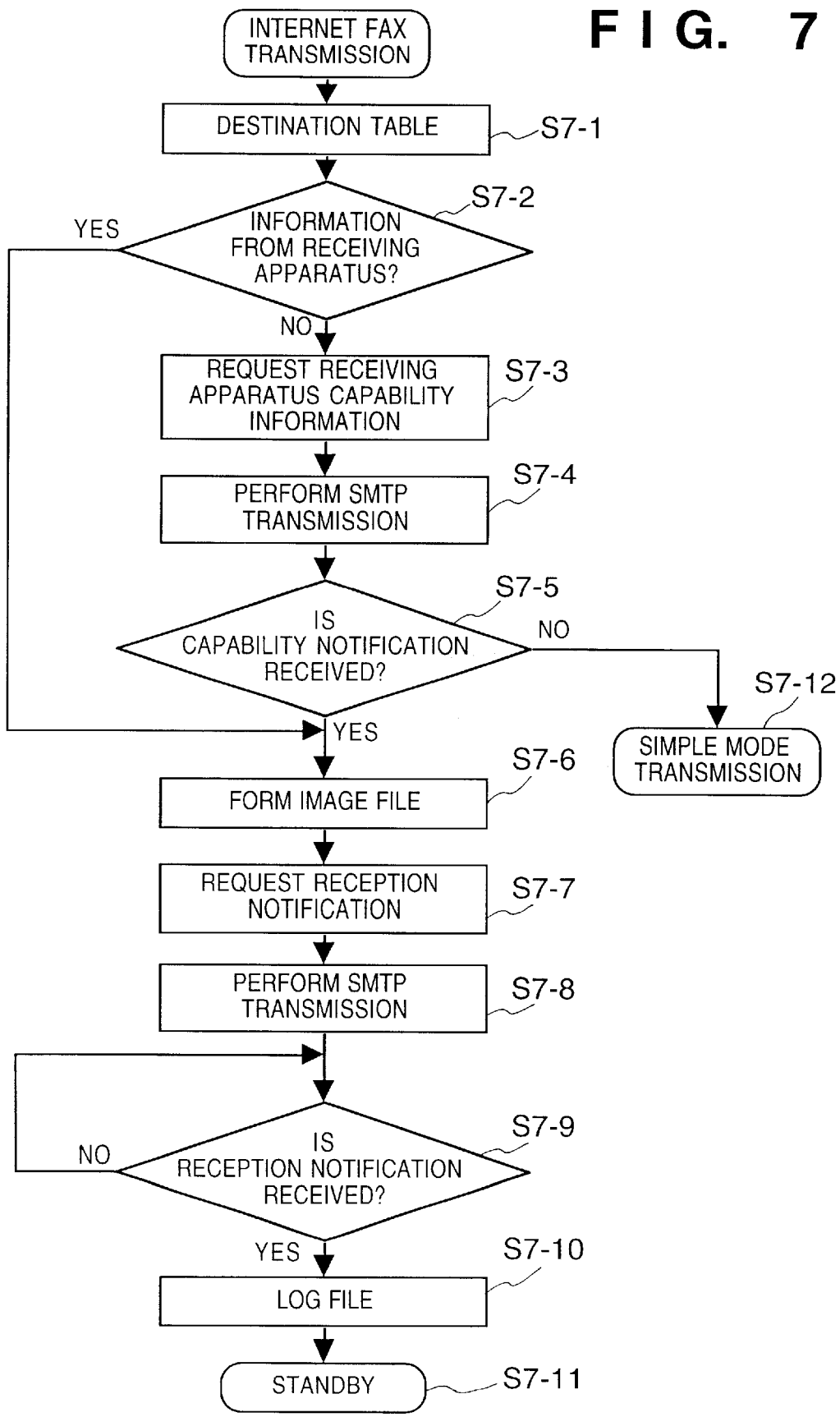
FIG. 7 is a flow chart of Internet FAX transmission in the embodiment.
Figure 8:
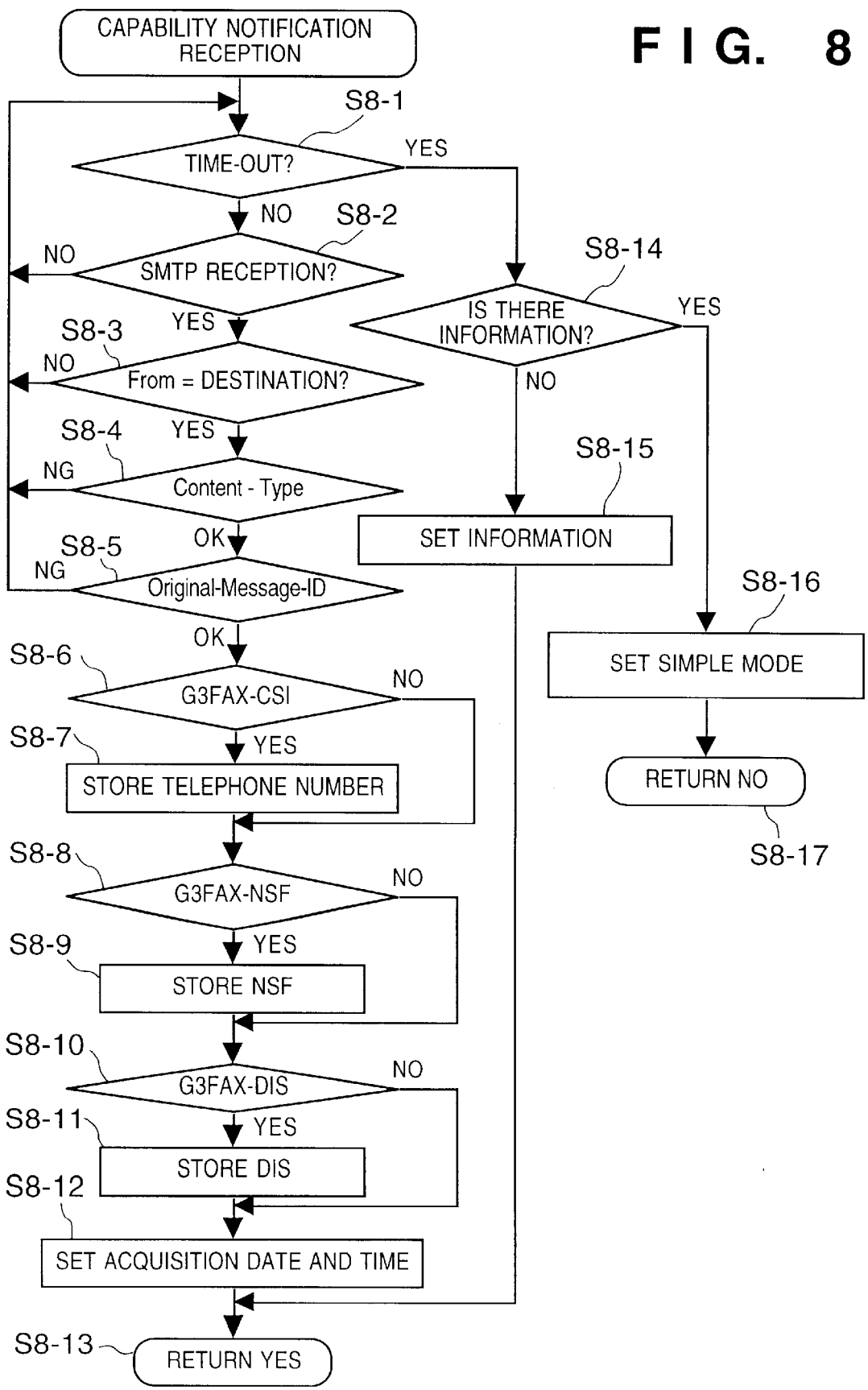
FIG. 8 is a flow chart of Internet FAX capability notification reception in the embodiment.
Figure 9:
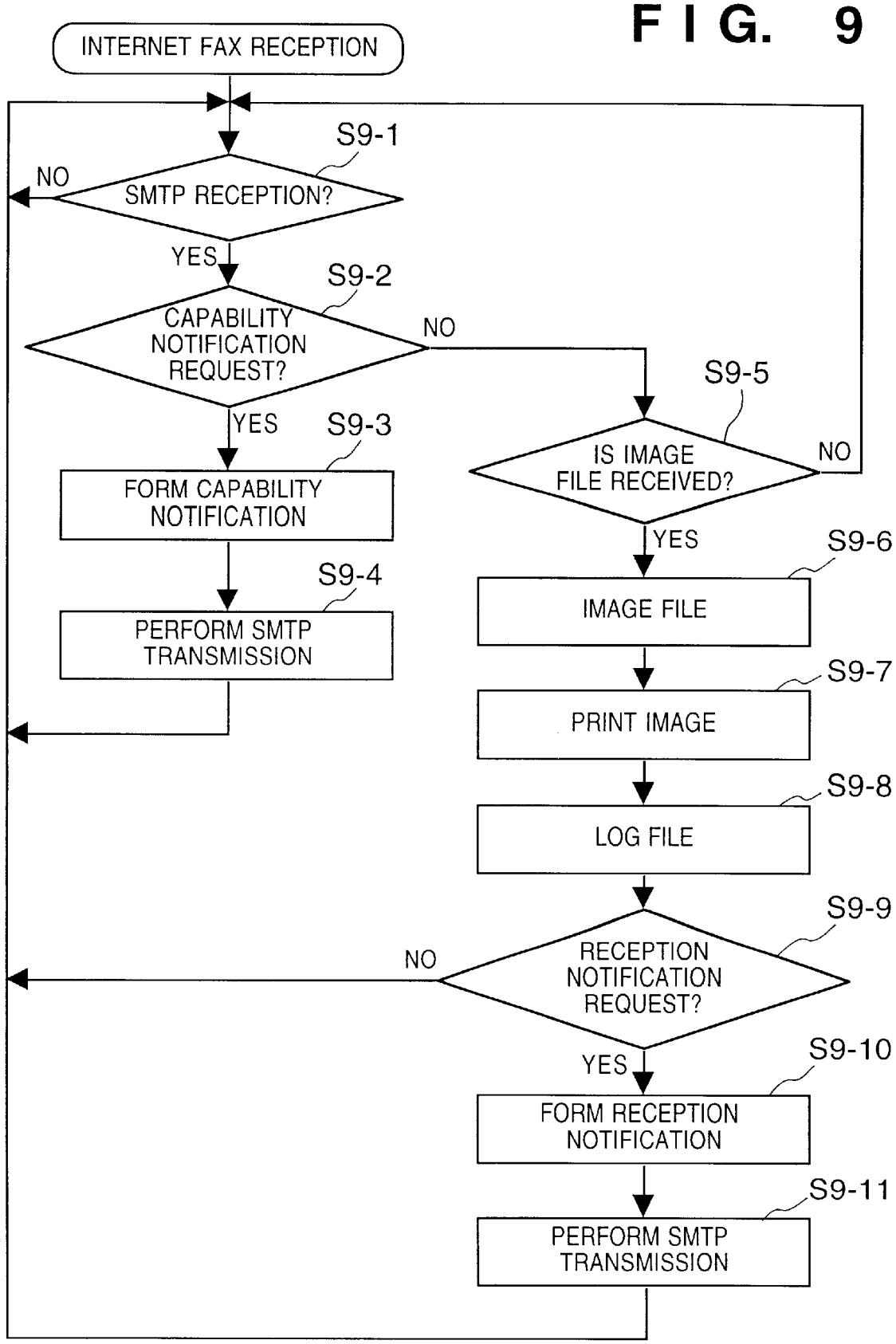
FIG. 9 is a flow chart of Internet FAX reception in the embodiment.

As described above, the Internet FAX apparatus of the present invention is so designed as to operate in the Internet FAX Simple Mode. The operation of the present invention will be described below with reference to:

FIG. 2 showing an Internet FAX capability notification request;

FIG. 3 showing an Internet FAX capability notification;

FIG. 4 showing Internet FAX image message transmission and reception notification requests;

FIG. 5 showing an Internet FAX reception notification;

FIG. 6 showing the format of destination data;

FIG. 7 showing a flow chart of Internet FAX transmission;

FIG. 8 showing a flow chart of Internet FAX capability notification reception;

FIG. 9 showing a flow chart of Internet FAX reception; and

Table 1 showing a list of success/error codes of Internet FAX reception results.

TABLE 1

List of Success/Error Codes of Internet FAX Reception Results

| | |
|---|---|
| "00" | Successful reception |
| "01" | Unsuccessful reception |
| "02" | Capabilities mismatch. The receiving terminal cannot interpret the message data correctly. |
| "03" | does not support the format used in this message |
| "04" | does not support relay feature |

Capability notification request e-mail transmitted from the transmitting apparatus will be described below with reference to FIG. 2.

Line 1 indicates the transmission time and date of the mail from the Internet FAX transmitting apparatus.

Line 2 indicates the sender of the mail from the Internet FAX transmitting apparatus.

Line 3 indicates the message ID of the mail.

Line 4 indicates the subject of the mail.

Line 5 indicates the destination of the Internet FAX mail.

Line 6 indicates the destination of an mdn disposition confirmation.

Line 7 indicates the contents of an mdn disposition confirmation request, i.e., an Internet FAX capability notification request.

Capability notification e-mail transmitted from the receiving apparatus in response to the capability notification request shown in FIG. 2 will be described below with reference to FIG. 3.

Line 1 indicates the transmission date and time of the mail from the Internet FAX receiving apparatus.

Line 2 indicates the sender of the mail from the Internet FAX receiving apparatus.

Line 3 indicates the message ID of the Internet FAX.

Line 4 indicates the subject of the message.

Line 5 indicates the destination of the Internet FAX mail.

Line 6 indicates the MIME version.

Lines 7 and 8 indicate that an Internet FAX disposition confirmation is sent in the mdn format.

Lines 10 to 29 indicate the mdn message.

Lines 11 to 15 indicate a human readable format.

Line 21 indicates the mdn recipient.

Line 22 indicates the message ID of the mdn requesting side.

Lines 23 and 24 indicate the contents of an mdn disposition confirmation process, i.e., Internet FAX capability notification.

Lines 25, 26, and 27 indicate the capability and telephone number of the Internet FAX receiving apparatus. The capability and telephone number of the receiving apparatus are transmitted by using the ITU-T T30 frame. That is, the telephone number is transmitted by X-G3Fax-CSI (Hex '40'), and the capability is transmitted by X-G3Fax-NSF (Hex '20') and X-G3Fax-DIS (Hex '80').

An image file and reception confirmation request e-mail transmitted from the Internet FAX transmitting apparatus will be described below with reference to FIG. 4.

Line 1 indicates the transmission date and time of the mail from the Internet FAX receiving apparatus.

Line 2 indicates the sender of the mail from the Internet FAX receiving apparatus.

Line 3 indicates the message ID of the Internet FAX.

Line 4 indicates the subject of the message.

Line 5 indicates the destination of the Internet FAX mail.

Line 6 indicates the MIME version.

Lines 7 to 11 indicate that an Internet FAX disposition confirmation request is sent in the mdn format. The instruction and telephone number of the receiving apparatus are transmitted by using the ITU-T T30 frame. That is, the telephone number is transmitted by X-G3Fax-TSI (Hex '43'), and the instruction is transmitted by X-G3Fax-NSS (Hex '20') and X-G3Fax-DCS (Hex '83') in the same manner as G3FAX.

Lines 15 to 18 indicate a text message.

Line 17 stores the text message.

Lines 19 to 14 indicate the image file.

Line 22 stores the TIFF-FX file converted into BASE64.

Reception confirmation e-mail transmitted from the Internet FAX receiving apparatus will be described below with reference to FIG. 5.

Line 1 indicates the transmission date and time of the mail from the Internet FAX receiving apparatus.

Line 2 indicates the sender of the mail from the Internet FAX receiving apparatus.

Line 3 indicates the message ID of the Internet FAX.

Line 4 indicates the subject of the message.

Line 5 indicates the destination of the Internet FAX mail.

Line 6 indicates the MIME version.

Lines 7 and 8 indicate that an Internet FAX disposition confirmation is sent in the mdn format.

Lines 10 to 30 indicate the mdn message.

Lines 11 to 16 indicate a human readable-format.

Line 21 indicates the mdn recipient.

Line 22 indicates the message ID of the mdn requesting side.

Lines 23 and 24 indicate the contents of an mdn disposition confirmation process, i.e., an Internet FAX capability notification.

Lines 26 and 27 indicate the contents of Internet FAX reception result. The reception result of the receiving apparatus is stored in X-G3FAX-Results by using the code shown in Table 1. The number of received pages is transmitted in X-G3FAX-pages, and an error page is transmitted in X-G3FAX-errorpage.

Lines 31 to 36 indicate a part or the whole of an original message or a reception report. Note that these lines 31 to 36 are options.

FIG. 6 shows the format of destination data.

Referring to FIG. 6, the Internet FAX function, Internet address, abbreviation of the other party, and Internet FAX capability are stored in the RAM 12 for each one-touch number.

When an operator presses a one-touch button on the operation unit 13, the CPU 5 reads out information (the Internet FAX function, Internet address, and abbreviation of the other party) of the corresponding one-touch number.

"Internet FAX function" is indicated by Simple, Full, or Unknown. If Simple is set, Simple-mode transmission is performed without capability exchange and disposition confirmation. If Full or Unknown is set, capability exchange and disposition confirmation are performed.

"Internet address" stores the e-mail address of the other party.

"Abbreviation of other party" stores the abbreviation of the other party.

"Internet FAX capability" stores information about the telephone number and FAX capability of the other party in the form of CSI, NSF, and DIS frames.

"Data acquisition date" indicates the date and time of reception of the FAX capability of the partner apparatus.

The flow of Internet FAX transmission will be described below with reference to FIG. 7.

An operator sets an original and presses one-touch button 01 on the operation unit.

In step S7-1, the CPU 5 checks destination 01 shown in FIG. 6. If the CPU 5 determines that the Internet FAX capability of destination 01 is "unknown" and has not been acquired yet, the flow advances to step S7-4, and the CPU 5 transmits the Internet FAX capability notification request shown in FIG. 2 by SMTP.

After transmitting the capability notification request, the CPU 5 receives the capability notification from the receiving apparatus in step S7-5. In step S7-6, the CPU 5 forms an image file corresponding to the capability of the receiving apparatus. In step S7-7, the CPU forms a reception notification request. In step S7-8, the CPU 5 transmits these file and request by SMTP. When receiving a reception notification in step S7-9, the CPU 5 forms a LOG file in step S7-10, and the flow returns to standby in step S7-11.

If a change to the Simple Mode is designated in step S7-5, the flow advances to Internet FAX Simple Mode transmission in step S7-12.

Details of the Internet FAX receiving apparatus capability notification reception in step S7-5 of FIG. 7 will be described below with reference to the flow chart shown in FIG. 8.

In step S8-1, the CPU 5 checks whether time-out occurs in the reception of a capability notification from the receiving apparatus. If NO in step S8-1 and SMTP reception is made in step S8-2, the flow advances to step S8-3, and the CPU 5 checks whether the contents of From are the same as the destination that has requested.

If Content-Type is an mdn in step S8-4, the flow advances to step S8-5, and the CPU 5 checks whether Original-Message-ID is the same as the transmitted message ID.

If G3Fax-CSI is found in step S8-6, the flow advances to step S8-7, and the CPU 5 stores this G3Fax-CSI in the telephone number of the destination data shown in FIG. 6.

If G3Fax-NSF is found in step S8-8, the flow advances to step S8-9, and the CPU 5 stores this G3Fax-NSF in the NSF of the destination data.

If G3Fax-DIS is found in step S8-10, the flow advances to step S8-11, and the CPU 5 stores this G3Fax-DIS in the DIS of the destination data.

In step S8-12, the CPU 5 sets the date and time of reception of the capability notification in the destination data shown in FIG. 6. If YES in step S8-13, the flow returns to step S7-6 of FIG. 7.

On the other hand, if time-out occurs in step S8-1, the flow advances to step S8-14, and the CPU 5 checks whether the destination data indicates the capability as a receiving apparatus. If YES in step S8-14, the CPU 5 sets this information in step S8-15. If YES in step S8-13, the flow returns to step S7-6 of FIG. 7.

If NO in step S8-14, the CPU 5 sets the Simple Mode in step S8-16. If NO in step S8-17, the flow returns to step S7-12 of FIG. 7.

The flow of Internet FAX reception will be described below with reference to FIG. 9.

In step S9-1, the CPU 5 checks whether SMTP reception is made. In step S9-2, the CPU 5 checks whether the SMTP reception indicates a capability notification request.

In step S9-3, the CPU 5 forms the message shown in FIG. 3 in accordance with the Internet FAX function of its own apparatus. In step S9-4, the CPU 5 transmits the message by SMTP.

If the SMTP reception does not indicate a capability notification request, the flow advances to step S9-5, and the CPU 5 checks whether an image file is received.

In step S9-6, the CPU 5 converts the image file into image data. In step S9-7, the image data is printed out on the basis of information of G3Fax-NSS and G3Fax-DCS.

In step S9-8, the CPU 5 writes the telephone number of the transmitting party in a LOG file by G3Fax-TSI. If a reception notification request is detected in step S9-9, the flow advances to step S9-10, and the CPU 5 forms the reception notification shown in FIG. 5 which contains the reception result, the number of received pages, and an error page. In step S9-11, the CPU 5 transmits the reception notification by SMTP.

As described above, the transmitting apparatus is informed of the Internet FAX function of the receiving apparatus by the mdn format and hence can transmit image data in accordance with the Internet FAX function of the receiving apparatus. Also, instructions from the transmitting apparatus can be transmitted by the mdn format.

The present invention can be applied to a system constituted by a plurality of devices (e.g., host computer, interface, reader, and printer) or to an apparatus (e.g., copying machine or facsimile) comprising a single device.

Further, the object of the present invention can also be achieved by providing a storage medium storing program codes of software for performing the aforesaid functions according to the embodiment to a system or an apparatus, reading the program codes with a computer (e.g., CPU or MPU) of the system or apparatus from the storage medium, and then executing-the program. In this case, the program codes read from the storage medium realize the functions according to the embodiments, and the storage medium storing the program codes constitutes the invention.

Further, the storage medium, such as a floppy disk, a hard disk, an optical disk, a magnetooptical disk, CD-ROM, CD-R, a magnetic tape, a nonvolatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

When the present invention is applied to the storage medium, this storage medium stores program codes for executing processes corresponding to the aforementioned flow charts.

As described above, the present invention can achieve the following effects:

(1) A transmitting apparatus transmits a capability notification request to a receiving apparatus by SMTP, and the receiving apparatus sends a capability notification by SMTP. Therefore, the transmitting apparatus can transmit optimum images by SMTP.

(2) A transmitting apparatus transmits an instruction by SMTP, and a receiving apparatus receives the instruction. This allows the receiving apparatus to appropriately process and print out images.

As many apparently widely different embodiments of the present invention can be made without departing from the spirit and scope thereof, it is to be understood that the invention is not limited to the specific embodiments thereof except as defined in the attached claims.

What is claimed is:

1. An Internet facsimile apparatus comprising:

means for reading an image;

means for converting the read image into an image file;

means for transmitting the converted image file by an SMTP protocol;

means for receiving an image file by the SMTP protocol;

means for converting the received image file into an image;

means for printing the converted image;

means for inquiring another apparatus of a receiving capability thereof by the SMTP protocol; and means for informing another apparatus of a receiving capability of said Internet facsimile apparatus by the SMTP protocol, wherein said receiving capability inquiring means inquires a receiving apparatus of a receiving capability thereof before transmission of an image file, a response of the receiving capability from said receiving apparatus is received, and an image is transmitted after being converted into an image file corresponding to the receiving capability of said receiving apparatus.

2. The apparatus according to claim 1, wherein said receiving capability informing means uses an mdn message format.

3. The apparatus according to claim 2, wherein a G3FAX T30 protocol signal format is used as the message format.

4. The apparatus according to claim 3, wherein, T30 CSI, NSF, and DIS frames are transmitted.

5. The apparatus according to claim 1, further comprising:

means for transmitting to a transmission destination a message requesting transmission of a reception confirmation message when an image file is transmitted; and means for transmitting a reception confirmation message to a transmitting party.

6. The apparatus according to claim 5, wherein said means for transmitting a message requesting transmission of a reception confirmation message when an image file is transmitted uses an mdn format.

7. The apparatus according to claim 5, wherein said means for transmitting a reception confirmation message uses an mdn format.

8. The apparatus according to claim 7, wherein the mdn confirmation message stores a message indicating that data is normally received and the number of received pages.

9. The apparatus according to claim 7, wherein the mdn confirmation message stores a message indicating an error page is received, the number of received pages, and the error page.

10. The apparatus according to claim 1, wherein said receiving capability inquiring means uses an mdn message format.

11. The apparatus according to claim 1, further comprising means for transmitting a message indicating information of a transmitting apparatus when an image file is transmitted.

12. The apparatus according to claim 11, wherein a G3FAX T30 protocol signal format is used as the message format.

13. The apparatus according to claim 12, wherein, T30 CSI, NSF, and DIS frames are transmitted.

14. A method of controlling an Internet facsimile apparatus, comprising the steps of:

reading an image;

converting the read image into an image file;

transmitting the converted image file by an SMTP protocol;

receiving an image file by the SMTP protocol;

converting the received image file into an image;

printing the converted image;

inquiring another apparatus of a receiving capability thereof by the SMTP protocol; and informing another apparatus of a receiving capability of said Internet facsimile apparatus by the SMTP protocol, wherein the receiving capability inquiring step inquires a receiving apparatus of receiving capability thereof before transmission of an image file, a response of the receiving capability from said receiving apparatus is received, and an image is transmitted after being converted into an image file corresponding to the receiving capability of said receiving apparatus.

15. An Internet facsimile apparatus comprising:

means for reading an image;

means for converting the read image into an image file;

transmitting the converted image file by an SMTP protocol; and means for inquiring another apparatus of a receiving capability thereof by the SMTP protocol, wherein said receiving capability inquiring means inquires a transmission destination of a receiving capability thereof before an image file is transmitted, and an image is transmitted after being converted into an image file corresponding to the receiving capability of said transmission destination.

16. An Internet facsimile apparatus comprising:

means for receiving an image file by an SMTP protocol;

means for converting the received image file into an image;

means for printing the converted image; and means for sending a receiving capability of a receiving apparatus by the SMTP protocol, wherein the image file converted in accordance with the receiving capability is received in response to an inquiry of the receiving capability from a transmitting party before the image file is received.

17. A network system having an Internet facsimile apparatus, characterized in that said Internet facsimile apparatus comprises:

means for converting the read image into an image file;

means for transmitting the converted image file by an SMTP protocol;

means for receiving an image file by the SMTP protocol;

means for converting the received image file into an image;

means for printing the converted image;

means for inquiring another apparatus of a receiving capability thereof by the SMTP protocol; and means for informing another apparatus of a receiving capability of said Internet facsimile apparatus by the SMTP protocol, said receiving capability inquiring means inquires a receiving apparatus of a receiving capability thereof before transmission of an image file, a response of the receiving capability from said receiving apparatus is received, and an image is transmitted after being converted into an image file corresponding to the receiving capability of said receiving apparatus.

18. A method of controlling a network system having an Internet facsimile apparatus, comprising the steps of:

reading an image;

converting the read image into an image file;

transmitting the converted image file by an SMTP protocol;

receiving an image file by the SMTP protocol;

converting the received image file into an image;

printing the converted image;

inquiring another apparatus of a receiving capability thereof by the SMTP protocol; and informing another apparatus of a receiving capability of said Internet facsimile apparatus by the SMTP protocol, wherein the receiving capability inquiring step inquires a receiving apparatus of receiving capability thereof before transmission of an image file, a response of the receiving capability from said receiving apparatus is received, and an image is transmitted after being converted into an image file corresponding to the receiving capability of said receiving apparatus.

19. A storage medium storing a control program for controlling an Internet facsimile apparatus in a computer readable form, wherein said control program comprises the steps of:

reading an image;

converting the read image into an image file;

transmitting the converted image file by an SMTP protocol;

receiving an image file by the SMTP protocol;

converting the received image file into an image;

printing the converted image;

inquiring another apparatus of a receiving capability thereof by the SMTP protocol; and informing another apparatus of a receiving capability of said Internet facsimile apparatus by the SMTP protocol, wherein the receiving capability inquiring step inquires a receiving apparatus of receiving capability thereof before transmission of an image file, a response of the receiving capability from said receiving apparatus is received, and an image is transmitted after being converted into an image file corresponding to the receiving capability of said receiving apparatus.

20. A communication apparatus comprising:

(a) means for storing information of a capability of a receiving apparatus;

(b) means for detecting if there is information of the receiving apparatus in the storing means; and (c) means for requesting said information of the receiving apparatus corresponding to a result of said detecting means by SMTP protocol.

21. A communication apparatus comprising:
(a) means for determining if a predetermined time has passed; and
(b) means for requesting information of a receiving apparatus;

wherein said requesting means requests said information from the receiving apparatus by SMTP protocol if said predetermined time has not passed.

* * * * *

UNITED STATES PATENT AND TRADEMARK OFFICE
CERTIFICATE OF CORRECTION

PATENT NO.    : 6,437,873 B1
DATED         : August 20, 2002
INVENTOR(S)   : Maeda It is certified that error appears in the above-identified patent and that said Letters Patent is hereby corrected as shown below:

Drawings,
Sheet 2, Fig. 2, "SENSER" should read -- SENDER --.
Sheet 3, Fig. 3, "@fuge.com>" should read -- @huge.com> --.
Sheet 4, Fig. 4, "SENSER" should read -- SENDER --.
Sheet 5, Fig. 5, "Recipientr" should read -- Recipient -- and "SENSER"
(both occurrences) should read -- SENDER -- and "@fuge.com>" should read
-- @huge.com> --.

Column 2,
Lines 64 and 65, "connected" should read -- connecting --.

Column 5,
Line 43, "human readable-format" should read -- human-readable format --.

Column 6,
Line 29, "these" should read -- this --; and
Line 45, "has" should read -- has been --.

Column 7,
Line 41, "executing-the" should read -- executing the --; and
Line 49, "are" should read -- that are --.

Signed and Sealed this

Fourth Day of February, 2003

JAMES E. ROGAN
*Director of the United States Patent and Trademark Office*